United States Patent
Choi et al.

(10) Patent No.: US 11,521,802 B2
(45) Date of Patent: Dec. 6, 2022

(54) SOLID ELECTROLYTE CAPACITOR AND FABRICATION METHOD THEREOF

(71) Applicant: SAMSUNG ELECTRO-MECHANICS CO., LTD., Suwon-si (KR)

(72) Inventors: Yu Jin Choi, Suwon-si (KR); Hyoung Sun Ham, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 260 days.

(21) Appl. No.: 16/878,994

(22) Filed: May 20, 2020

(65) Prior Publication Data
US 2021/0151258 A1    May 20, 2021

(30) Foreign Application Priority Data
Nov. 20, 2019 (KR) .................. 10-2019-0149385

(51) Int. Cl.
| | | |
|---|---|---|
| H01G 9/15 | (2006.01) | |
| H01G 9/052 | (2006.01) | |
| H01G 9/00 | (2006.01) | |
| H01G 11/46 | (2013.01) | |
| H01G 11/42 | (2013.01) | |
| H01G 11/48 | (2013.01) | |
| H01G 9/04 | (2006.01) | |

(52) U.S. Cl.
CPC ......... *H01G 9/0525* (2013.01); *H01G 9/0036* (2013.01); *H01G 11/42* (2013.01); *H01G 11/46* (2013.01); *H01G 11/48* (2013.01); *H01G 2009/05* (2013.01)

(58) Field of Classification Search
None
See application file for complete search history.

(56) References Cited

U.S. PATENT DOCUMENTS

| | | | |
|---|---|---|---|
| 10,199,176 B2* | 2/2019 | Uka | H01G 9/15 |
| 2006/0086596 A1* | 4/2006 | Lee | F03G 7/00 |
| | | | 200/181 |
| 2010/0271757 A1* | 10/2010 | Ishikawa | H01G 9/0036 |
| | | | 427/487 |
| 2014/0063691 A1* | 3/2014 | Kosuge | H01G 9/025 |
| | | | 361/525 |
| 2016/0163466 A1* | 6/2016 | Naito | H01G 9/0425 |
| | | | 29/25.03 |

(Continued)

FOREIGN PATENT DOCUMENTS

| | | | | |
|---|---|---|---|---|
| CN | 101136285 A | * | 3/2008 | ............ H01G 11/48 |
| DE | 102006007785 A1 | * | 9/2006 | ............ H01G 11/48 |

(Continued)

*Primary Examiner* — Dion R. Ferguson
(74) *Attorney, Agent, or Firm* — Morgan, Lewis & Bockius LLP

(57) ABSTRACT

A solid electrolyte capacitor includes a sintered body formed by sintering a molded body containing a metal powder; and a solid electrolyte layer disposed on the sintered body, wherein the solid electrolyte layer includes a first layer containing an electrolytic polymerization conductive polymer disposed on the sintered body and a second layer containing a chemical polymerization conductive polymer disposed on the first layer.

21 Claims, 2 Drawing Sheets

(56) References Cited

U.S. PATENT DOCUMENTS

| | | | | |
|---|---|---|---|---|
| 2016/0181021 A1* | 6/2016 | Kwak | ................... | H01G 9/15 |
| | | | | 361/528 |
| 2019/0086381 A1* | 3/2019 | Millman | .............. | H01G 4/2325 |
| 2021/0151258 A1* | 5/2021 | Choi | ................... | H01G 9/025 |

FOREIGN PATENT DOCUMENTS

| | | | | | |
|---|---|---|---|---|---|
| JP | H1092699 | A | * 4/1998 | ............ | H01G 9/028 |
| JP | 2008-235645 | A | 10/2008 | | |
| JP | 2008235645 | A | * 10/2008 | .......... | H01G 9/0036 |
| JP | 2014-060231 | A | 4/2014 | | |
| JP | 2014060231 | A | * 4/2014 | | |
| JP | 6745431 | B2 | * 8/2020 | ......... | C08G 73/0266 |
| KR | 10-2012-0051986 | A | 5/2012 | | |
| KR | 20120051986 | A | * 5/2012 | ............ | H01G 9/025 |
| KR | 20210156847 | A | * 12/2021 | ............ | H01G 9/028 |
| WO | WO-2019131476 | A1 | * 7/2019 | .......... | H01G 9/0036 |

\* cited by examiner

SOLID ELECTROLYTE CAPACITOR AND FABRICATION METHOD THEREOF

CROSS-REFERENCE TO RELATED APPLICATION

This application claims the benefit of priority to Korean Patent Application No. 10-2019-0149385 filed on Nov. 20, 2019, with the Korean Intellectual Property Office, the disclosure of which is incorporated herein by reference.

BACKGROUND

The present disclosure relates to a solid electrolyte capacitor and a fabrication method thereof, and relates to a solid electrolyte capacitor excellent in terms of heat resistance and resistant to moisture resistance load and a fabrication method thereof.

A tantalum (Ta) material is a metal that is widely used throughout various industries such as electrical, electronic, mechanical, chemical, aerospace, and military fields due to having mechanical and physical characteristics such as a high melting point, excellent ductility and excellent corrosion-resistance, or the like.

In particular, since the tantalum material may form the most stable anodic oxide film, tantalum has been widely used as a material in forming anodes for small capacitors.

Moreover, due to the rapid development of the IT industry, such as electronics and information and communication, the use of tantalum materials is increasing rapidly every year by 10%.

A tantalum capacitor has a structure that uses a gap that appears when the tantalum powder is sintered and hardened, and forms a tantalum oxide ($Ta_2O_5$) on a surface of the tantalum as an electrode metal by an anodic oxidation method, and uses it as a dielectric to form a manganese dioxide ($MnO_2$) layer or a conductive polymer layer thereon as a solid electrolyte.

In addition, due to the derivation of a cathode electrode, a silver (Ag) layer is formed as a carbon layer and a metal layer on the manganese dioxide ($MnO_2$) layer or the conductive polymer layer.

With the recent development of small and high-capacity products, capacitors also require high capacity, low ESR, ESL, and excellent DC-bias characteristics.

Conventionally, in a tantalum capacitor, a solid electrolyte layer is formed by applying electrolytic polymerization technologies or chemical polymerization technologies.

However, each of the electrolytic polymerization technologies or chemical polymerization technologies had technical limitations and disadvantages.

Accordingly, there is an increasing demand for developing high-reliability tantalum capacitors excellent in terms of heat resistance and resistant to moisture resistance load in high-reliability capacitors, particularly capacitors for electric fields.

SUMMARY

An aspect of the present disclosure is to provide a solid electrolyte capacitor and a fabrication method thereof, and relates to solid electrolyte capacitor excellent in terms of heat resistance and resistant to moisture resistance load and a fabrication method thereof.

An electrolyte capacitor includes: a sintered body formed by sintering a molded body containing a metal powder and a solid electrolyte layer disposed on the sintered body, wherein the solid electrolyte layer includes a first layer containing an electrolytic polymerization conductive polymer disposed on the sintered body and a second layer containing a chemical polymerization conductive polymer disposed on the first layer.

According to another aspect of the present disclosure, a fabrication method of a solid electrolyte capacitor includes operations of: forming a sintered body by sintering; forming a first layer containing an electrolytic polymerization conductive polymer disposed on the sintered body by electrolytic polymerization; and forming a second layer containing a chemical polymerization conductive polymer disposed on the first layer by chemical polymerization.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
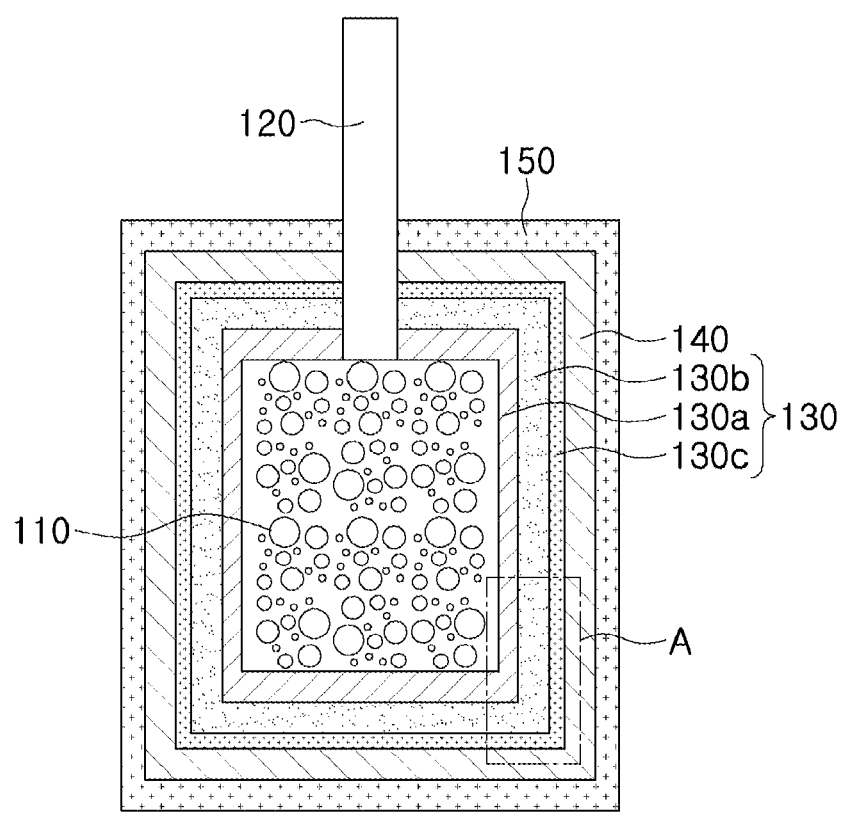
FIG. 1 is a cross-sectional view of a solid electrolytic capacitor according to an embodiment of the present disclosure.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clarity of description, and elements indicated by the same reference numeral are same elements in the drawings.

A value used to describe a parameter such as a 1-D dimension of an element including, but not limited to, "length," "width," "thickness," diameter," "distance," "gap," and/or "size," a 2-D dimension of an element including, but not limited to, "area" and/or "size," a 3-D dimension of an element including, but not limited to, "volume" and/or "size", and a property of an element including, not limited to, "roughness," "density," "weight," "weight ratio," and/or "molar ratio" may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

Hereinafter, embodiments of the present disclosure will be described as follows with reference to the attached drawings.

FIG. 1 is a cross-sectional view of a solid electrolytic capacitor according to an embodiment of the present disclosure.

Figure 2:
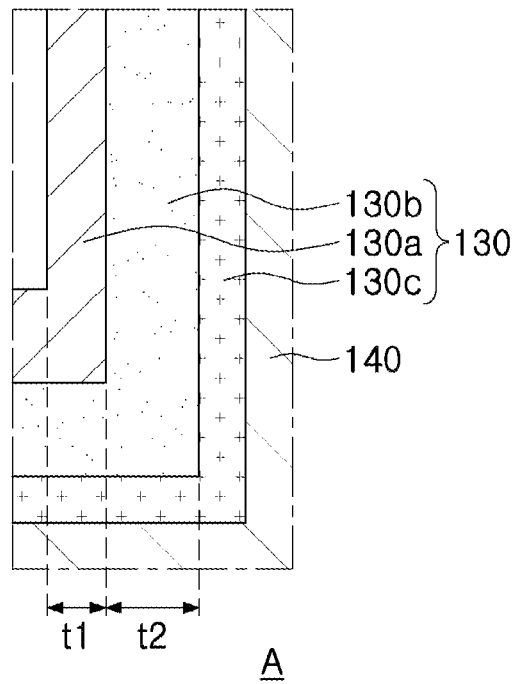
FIG. 2 is an enlarged view of region A of FIG. 1.

FIG. 2 is an enlarged view of region A of FIG. 1.

Referring to FIGS. 1 and 2, a solid electrolytic capacitor according to an embodiment of the present disclosure includes: a sintered body 110 formed by sintering a molded body containing a metal powder; and a solid electrolyte layer 130 disposed on the sintered body 110. The solid electrolyte layer 130 includes a first layer 130a containing an electrolytic polymerization conductive polymer disposed on the sintered body 110 and a second layer 130b containing a chemical polymerization conductive polymer disposed on the first layer 130a.

The solid electrolytic capacitor may further include an anode lead wire 120 having an insertion region located inside the sintered body 110 and a non-insertion region located outside of the sintered body 110.

The sintered body 110 may be formed by sintering a molded body including a metal powder and a binder.

Specifically, a metal powder, a binder, and a solvent may be mixed and stirred at a predetermined ratio, and the mixed powder may be compressed into a rectangular parallelepiped form, and then sintered under high temperature and high vibration.

The metal powder is not particularly limited as long as it can be used in the sintered body of the solid electrolytic capacitor according to an embodiment of the present disclosure, may be one or more selected from a group consisting of, for example, tantalum (Ta), aluminum (Al), niobium (Nb), vanadium (V), titanium (Ti), and zirconium (Zr).

In particular, the sintered body of the solid electrolytic capacitor according to an embodiment of the present disclosure may be formed using tantalum (Ta) powder.

The binder is not particularly limited, and may be, for example, a cellulose-based binder.

The cellulose-based binder may be one or more selected from a group consisting of nitrocellulose, methyl cellulose, ethyl cellulose, and hydroxy propyl cellulose.

In addition, the anode lead wire 120 may be inserted into and mounted thereon to be eccentric from the center before compressing the mixed powder.

According to an embodiment of the present disclosure, a dielectric oxide layer may be formed on the sintered body 110 as an insulating layer.

That is, the dielectric oxide layer may be formed by growing an oxide film ($Ta_2O_5$) on a surface of the sintered body 110 by a chemical treatment process using an electrochemical reaction.

In this case, the dielectric oxide layer changes the sintered body 110 into a dielectric.

A solid electrolyte layer 130 having a polarity of a cathode may be applied on the dielectric oxide layer.

The solid electrolyte layer 130 is not particularly limited, and may be formed of, for example, one or more selected from a group consisting of manganese dioxide ($MnO_2$) and a conductive polymer, and may be particularly formed of a conductive polymer.

Specifically, in the case that a conductive polymer is used for the solid electrolyte layer, a cathode layer having a conductive polymer cathode may be formed on an outer surface of the sintered body 110 comprising an insulating layer by polymerization or electrolytic polymerization of 3,4-ethylenedioxythiophene (EDOT) or pyrrole monomer.

With the recent development of small and high-capacity products, capacitors also require high capacity, low equivalent series resistance (ESR), equivalent series inductance (ESL), and excellent DC-bias characteristics.

Conventionally, in a tantalum capacitor, a solid electrolyte layer was formed by applying an electrolytic polymerization technology using pyrrole monomer or a chemical polymerization technology using EDOT 3,4-ethylenedioxythiophene (EDOT).

However, the electrolytic polymerization technology or the chemical polymerization technology had technological limitations and disadvantages, respectively.

Accordingly, there is an increasing demand for developing high-reliability tantalum capacitors that are excellent in terms of heat resistance and resistant to moisture resistance load in high-reliability capacitors, particularly capacitors for electric fields.

According to an embodiment of the present disclosure, the solid electrolyte layer 130 includes a first layer 130a including an electrolytic polymerization conductive polymer disposed on the sintered body 110 and a second layer 130b including a chemical polymerization conductive polymer disposed on the first layer 130a.

The first layer 130a includes an electrolytic polymerization conductive polymer, and is formed by an electrolytic polymerization. The first layer 130a may be disposed on the sintered body 110, and in particular, may be in contact with a dielectric oxide layer disposed on the sintered body 110.

The second layer 130b includes a chemical polymerization conductive polymer, is formed by a chemical polymerization, and is disposed on the first layer 130a.

In the case that the second layer 130b is formed by the electrolytic polymerization, it is possible to form a uniform and high-strength polymer film inside a semi-finished product, and to use a high capacitance voltage (CV) powder during a process of applying electricity to form the polymer layer. Accordingly, it has the advantage of excellent moisture resistance characteristics when manufacturing a finished product.

However, in the case of electrolytic polymerization, there is a disadvantage that it is difficult to form a thick polymer film.

Meanwhile, in the case of chemical polymerization, a cathode layer is formed by dipping a semi-finished product several times into 3,4-ethylenedioxythiophene (EDOT) monomer solution, and it is possible to obtain a high-pressure tolerant product due to its excellent heat resistance. It has, however, disadvantages that the resultant product is vulnerable to moisture and that it is difficult to use high capacitance voltage (CV) powder because dipping is uneven when pores are clogged.

According to an embodiment of the present disclosure, while using high capacitance voltage (CV) powder, a uniform cathode layer may be formed inside the tantalum capacitor through an electrolytic polymerization of pyrrole, and there is an advantage that the thickness of the cathode layer may increase through a dipping method using 3,4-ethylenedioxythiophene (EDOT) outside of the tantalum capacitor.

Thereby, in the present embodiment, it is possible to use a high capacitance voltage (CV) powder, forma cathode layer uniformly, and obtain a resultant product possessing a high-capacity high-pressure, and solid electrolytic capacitor excellent in terms of heat resistance and resistant to moisture resistance load.

Specifically, according to an embodiment of the present disclosure, a first layer 130a including an electrolytic polymerization conductive polymer is disposed on the sintered body 110.

The first layer 130a may be formed using a high capacitance voltage (CV) powder, and may be formed by electrolytic polymerization to form a polymer layer by applying electricity.

The first layer 130a may include polypyrrole.

In addition, a second layer 130b containing a chemical polymerization conductive polymer is disposed on the first layer 130a.

The second layer 130b may be formed through a chemical polymerization by dipping the sintered body 110 several times into 3,4-ethylenedioxythiophene (EDOT) monomer solution.

The second layer 130b may include EDOT (3,4-ethylenedioxythiophene).

According to an embodiment of the present disclosure, since the first layer 130a is disposed on the sintered body 110 by the electrolytic polymerization method, when a second layer 130b is formed by the chemical polymerization method on the first layer 130a, the second layer 130b may be evenly formed through dip coating since pores are not clogged.

Referring to FIG. 2, a ratio (t2/t1) of a thickness (t2) of the second layer 130b to a thickness (t1) of the first layer 130a may satisfy $1.5 \leq t2/t1 \leq 10.0$.

By adjusting the ratio (t2/t1) of the thickness (t2) of the second layer 130b to the thickness (t1) of the first layer 130a to satisfy $1.5 \leq t2/t1 \leq 10.0$, a high capacitance voltage (CV) powder can be used, and a cathode layer can be uniformly formed, so that a high-capacity high-voltage solid electrolytic capacitor excellent in terms of heat resistance and resistant to moisture resistance load can be realized.

When the ratio (t2/t1) of the thickness (t2) of the second layer 130b to the thickness (t1) of the first layer 130a is less than 1.5, the thickness (t2) of the second layer 130b is too thin, which can lead to poor moisture resistance, and there is also a problem in heat resistance, making it difficult to implement high-pressure products.

When the ratio (t2/t1) of the thickness (t2) of the second layer 130b to the thickness (t1) of the first layer 130a exceeds 10.0, the thickness (t2) of the second layer 130b is too thick, moisture resistance and heat resistance are improved, but there is a problem that it is difficult to implement a small high-capacity tantalum capacitor Meanwhile, the solid electrolyte layer 130 may further include a third layer 130c formed of manganese dioxide ($MnO_2$), for example, on the second layer 130b. In order to form the manganese dioxide ($MnO_2$) layer, the sintered body 110 formed of the dielectric oxide layer is impregnated with a nitric acid-manganese solution so that a nitric acid-manganese solution is applied to the outer surface thereof, and then sintered and a manganese dioxide ($MnO_2$) layer having a cathode can be formed.

Next, a carbon layer 140 is stacked on the solid electrolyte layer 130, a carbon powder is dissolved in an organic solvent containing an epoxy-based resin, and the sintered body 110 is impregnated in a solution in which the carbon powder is dissolved, and then dried at a predetermined temperature to volatilize the organic solvent.

In addition, the carbon layer 140 may serve to prevent silver (Ag) ions from passing therethrough.

Next, a silver (Ag) layer 150 formed of a silver (Ag) paste may be included on an upper surface of the carbon layer 140.

The silver (Ag) layer 150 may be stacked on the outside of the carbon layer 140 to improve conductivity.

In addition, the silver (Ag) layer 150 may improve the conductivity for polarity of the cathode layer, thereby facilitating an electrical connection for polarity transfer.

Figure 3:
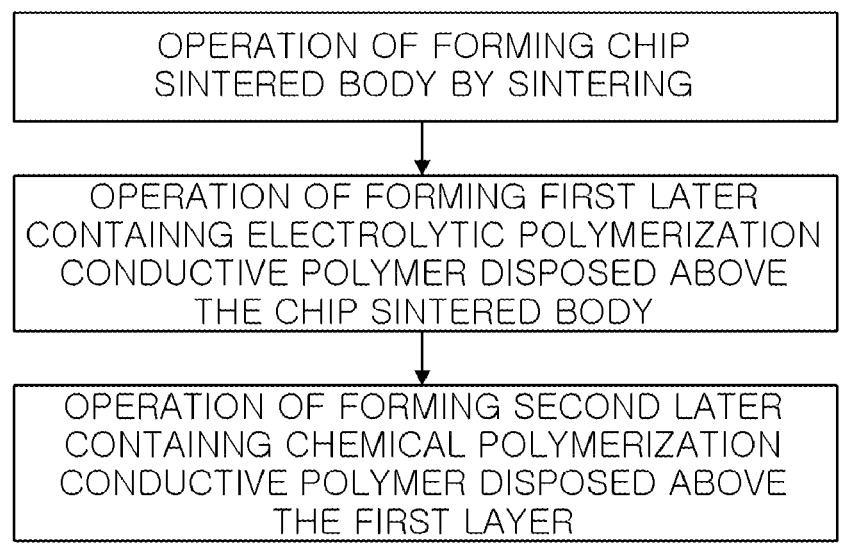
FIG. 3 is a manufacturing process diagram of a solid electrolytic capacitor according to another embodiment of the present disclosure.

FIG. 3 is a manufacturing process diagram of a solid electrolytic capacitor according to another embodiment of the present disclosure.

Referring to FIG. 3, a manufacturing method of a solid electrolytic capacitor according to another embodiment of the present disclosure includes operations of: forming a sintered body by sintering; forming a first layer containing an electrolytic polymerization conductive polymer on the sintered body by electrolytic polymerization, and forming a second layer containing a chemical polymerization conductive polymer on the first layer by chemical polymerization.

In the manufacturing method the solid electrolytic capacitor, first, a sintered body is formed by sintering.

In the method of forming the sintered body, the sintered body 110 is molded such that the anode wire 120 is disposed to be eccentric therefrom. In more detail, for example, the tantalum powder and the binder are mixed and stirred at a certain ratio, the mixed powder is compressed into a cuboid form, and then sintered under high temperature and high vibrations to mold the sintered body 110.

Meanwhile, the anode wire 120 is eccentric from the center of the sintered body 110 before compressing the mixed powder, and is inserted into and mounted thereon such that one end thereof protrudes to the outside. Thereafter, an insulating layer and a solid electrolyte layer 130, which is a cathode layer, are formed on the sintered body 110.

In the operation of forming the solid electrolyte layer 130, according to another embodiment of the present disclosure, an operation of forming a first layer containing an electrolytic polymerization conductive polymer on the sintered body by electrolytic polymerization and an operation of forming a second layer containing a chemical polymerization conductive polymer on the first layer by chemical polymerization are included.

Specifically, according to another embodiment of the present disclosure, a first layer 130a containing an electrolytic polymerization conductive polymer is formed on the sintered body 110.

The first layer 130a may be formed using a high capacitance voltage (CV) powder, and may be formed by electrolytic polymerization by applying electricity.

The first layer 130a may include polypyrrole.

Next, a second layer 130b including a chemical polymerization conductive polymer is formed on the first layer 130a.

The second layer 130b may be formed by chemical polymerization through dipping the sintered body 110 several times into an EDOT (3,4-ethylenedioxythiophene) monomer solution.

The second layer 130b may include a polymer of 3,4-ethylenedioxythiophene (EDOT).

According to another embodiment of the present disclosure, since the first layer 130a is formed on the sintered body 110 by the electrolytic polymerization method, when the second layer 130b is formed by the chemical polymerization method on the first layer 130a, the second layer 130b may be evenly formed during dipping, since pores are not clogged.

Accordingly, it is possible to use a high capacitance voltage (CV) powder, and it is possible to form a cathode layer uniformly, such that a high-capacity, high-pressure, and solid electrolytic capacitor excellent in terms of heat resistance and resistant to moisture resistance load may be realized.

A carbon layer 140 and a silver (Ag) layer 150 may be sequentially stacked on the chip body 110 on which the solid electrolyte layer 130, which is the cathode layer, is formed, so that conductivity of a polarity of the cathode layer is improved.

Other features are the same as the description of the solid electrolytic capacitor according to an embodiment of the present disclosure described above, and thus a detailed description thereof will be omitted.

As set forth above, according to the present disclosure, a solid electrolyte layer of the solid electrolytic capacitor may include a first layer containing an electrolytic polymerization conductive polymer and a second layer containing a chemical polymerization conductive polymer disposed on the first layer, such that a high capacitance voltage (CV) powder may be used, and a cathode layer may be uniformly formed, and a high-capacity, high-pressure, solid electrolytic capacitor with excellent in terms of heat resistance and resistant to moisture resistance load can be achieved.

However, various and advantageous advantages and effects of the present embodiment are not limited to the above description, and will be more readily understood in the course of describing specific embodiments of the present disclosure.

While exemplary embodiments have been shown and described above, it will be apparent to those skilled in the art that modifications and variations could be made without departing from the spirit and scope of the present disclosure as defined by the appended claims.

What is claimed is:

1. A solid electrolyte capacitor, comprising:
an anode body; and
a solid electrolyte layer disposed on the anode body,
wherein the solid electrolyte layer includes a first layer containing an electrolytic polymerization conductive polymer disposed on the anode body, and a second layer containing a chemical polymerization conductive polymer disposed on the first layer, and
wherein a ratio (t2/t1) of a thickness (t2) of the second layer to a thickness (t1) of the first layer satisfies $1.5 \leq t2/t1 \leq 5$.

2. The solid electrolyte capacitor of claim 1, wherein the first layer containing the electrolytic polymerization conductive polymer comprises polypyrrole.

3. The solid electrolyte capacitor of claim 1, wherein the second layer containing the chemical polymerization conductive polymer comprises a 3,4-ethylenedioxythiophene (EDOT) polymer.

4. The solid electrolyte capacitor of claim 1, wherein the anode body contains a metal, and the metal comprises one or more selected from a group consisting of tantalum (Ta), aluminum (Al), niobium (Nb), vanadium (V), titanium (Ti), and zirconium (Zr).

5. The solid electrolyte capacitor of claim 1, wherein the first layer is in contact with a dielectric oxide layer disposed on the sintered body.

6. The solid electrolyte capacitor of claim 1, further comprising:
a carbon layer disposed on the solid electrolyte layer; and
a silver (Ag) layer disposed on the carbon layer.

7. A method of fabricating a solid electrolyte capacitor, comprising operations of:
forming an anode body by sintering;
forming a first layer containing an electrolytic polymerization conductive polymer disposed on the anode body by electrolytic polymerization; and
forming a second layer containing a chemical polymerization conductive polymer disposed on the first layer by chemical polymerization,
wherein a ratio (t2/t1) of a thickness (t2) of the second layer to a thickness (t1) of the first layer satisfies $1.5 \leq t2/t1 \leq 5$.

8. The method of claim 7, wherein the first layer containing the electrolytic polymerization conductive polymer comprises polypyrrole.

9. The method of claim 7, wherein the second layer containing the chemical polymerization conductive polymer comprises a 3,4-ethylenedioxythiophene (EDOT) polymer.

10. The method of claim 7, wherein the anode body is formed by sintering a metal powder, the metal powder comprising one or more selected from a group consisting of tantalum (Ta), aluminum (Al), niobium (Nb), vanadium (V), titanium (Ti), and zirconium (Zr).

11. The method of claim 7, wherein the first layer is in contact with a dielectric oxide layer disposed on the sintered body.

12. The method of claim 7, further comprising operations of:
forming a carbon layer on solid electrolyte layer; and
forming a silver (Ag) layer on the carbon layer.

13. The method of claim 7, wherein the forming the second layer by chemical polymerization is performed by dipping the sintered body into a paste containing the chemical polymerization conductive polymer.

14. A solid electrolyte capacitor, comprising:
an anode body; and
a solid electrolyte layer disposed on the anode body,
wherein the solid electrolyte layer includes a first layer containing an electrolytic polymerization conductive polymer disposed on the anode body, and a second layer containing a chemical polymerization conductive polymer disposed on the first layer, and
wherein the solid electrolyte layer further includes a third layer comprising manganese dioxide ($MnO_2$).

15. The solid electrolyte capacitor of claim 14, wherein a ratio (t2/t1) of a thickness (t2) of the second layer to a thickness (t1) of the first layer satisfies $1.5 \leq t2/t1 \leq 10.0$.

16. The solid electrolyte capacitor of claim 14, wherein a ratio (t2/t1) of a thickness (t2) of the second layer to a thickness (t1) of the first layer satisfies $1.5 \leq t2/t1 \leq 5$.

17. The solid electrolyte capacitor of claim 14, wherein the first layer containing the electrolytic polymerization conductive polymer comprises polypyrrole.

18. The solid electrolyte capacitor of claim 14, wherein the second layer containing the chemical polymerization conductive polymer comprises a 3,4-ethylenedioxythiophene (EDOT) polymer.

19. The solid electrolyte capacitor of claim 14, wherein the anode body contains a metal; and
wherein the metal comprises one or more selected from a group consisting of tantalum (Ta), aluminum (Al), niobium (Nb), vanadium (V), titanium (Ti), and zirconium (Zr).

20. The solid electrolyte capacitor of claim 14, wherein the first layer is in contact with a dielectric oxide layer disposed on the anode body.

21. The solid electrolyte capacitor of claim 14, further comprising:
a carbon layer disposed on the solid electrolyte layer; and
a silver (Ag) layer disposed on the carbon layer.

* * * * *